Aug. 24, 1954  M. P. LAURENT  2,687,229
PRESSURE TIGHTENED JOINT
Filed March 3, 1953  3 Sheets-Sheet 1

INVENTOR
Milton P. Laurent

BY

ATTORNEY

Aug. 24, 1954 M. P. LAURENT 2,687,229
PRESSURE TIGHTENED JOINT
Filed March 3, 1953 3 Sheets-Sheet 2

INVENTOR
Milton P. Laurent

BY

ATTORNEY

Aug. 24, 1954  M. P. LAURENT  2,687,229
PRESSURE TIGHTENED JOINT
Filed March 3, 1953  3 Sheets-Sheet 3
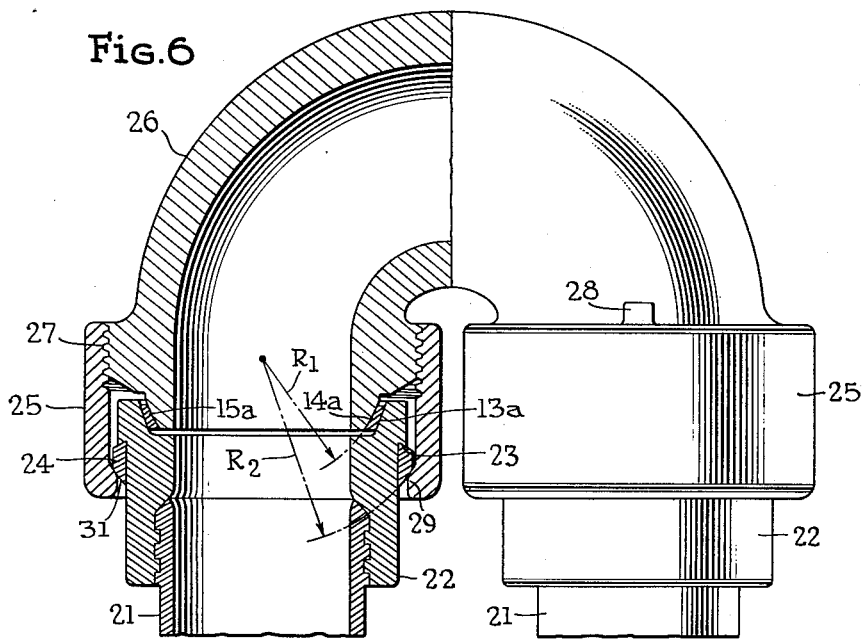
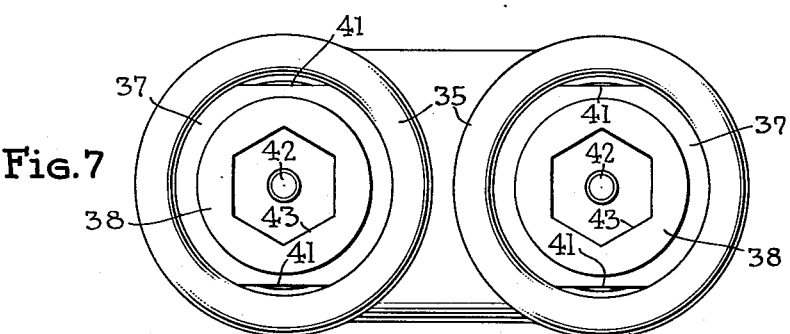
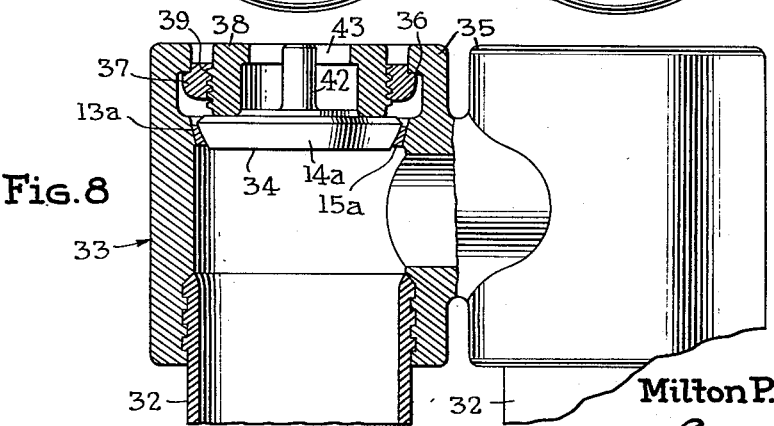
INVENTOR
Milton P. Laurent
BY
ATTORNEY Patented Aug. 24, 1954

2,687,229

UNITED STATES PATENT OFFICE 2,687,229

PRESSURE TIGHTENED JOINT

Milton P. Laurent, Houston, Tex.

Application March 3, 1953, Serial No. 340,119

8 Claims. (Cl. 220—46)

This invention relates to pipe joints and couplings, and particularly to such joints designed to seal against high pressures and to remain tight despite the effects of thermal expansion and contraction affecting either the diameter of the joint or the lengths of the connected pipes or both.

In Patent No. 2,582,995, January 22, 1952, I describe and claim a pressure-tightened joint in which an internally and externally tapered ring fills and seals the tapered annular interval between two parts which are so urged relatively to one another that the fluid pressure tends to reduce the interval between them, and at the same time force the ring into the interval. The reaction is in the direction in which the diameters of the convex and the encircling concave surfaces diminish. Thus, the ring stresses are all compressive, and oppose one another.

This is a desirable relationship, but not available for every type of joint because of problems incident to assembly. The patented arrangement has not been adaptable to various types of pipe joint.

In a pipe joint, for example, rising pressure in the pipe tends to separate the ends of the pipe and enlarge the interval so that the force reactions are quite different from those encountered in the device of the issued patent. In the patented device motion of the sealing ring is resisted by the force reaction between the connected parts, but in a pipe joint the minute relative movements of the connected pipes favor movement of the sealing ring in response to the pressure to which it is subject, and such movements occur with resulting attenuation of the ring. The ring is urged by the fluid pressure in the direction in which the diameter of the convex seal surface increases and that of the encircling concave seal surface also increases, but at a less rate. As a consequence the ring is squeezed or compressed radially and at the same time stressed in hoop tension. These stresses are concurrent rather than opposed to one another, in that each favors attenuation, which reduces the cross sectional area of the ring, and by so doing introduces a new difficulty.

A significant aspect of the invention is the formation of the seal surfaces to afford an interval of special form, which necessarily is reflected in the form of the sealing ring when the ring is in its unstressed condition. For reasons which will be made plain, the forms of the seal surfaces are such that displacement of the ring under pressure and its deformation by the two stresses mentioned always maintains sealing contact of the ring with both seal surfaces between which it is interposed.

It is characteristic of the invention that the development of sealing contact by the ring is effected by fluid pressure and is not dependent on forcing the seal surfaces which mate with the ring toward one another. As a consequence, the mechanical connections do not have to be set up very tight initially, and the joint is capable of "working" while under heavy pressure.

These characteristics are of great value in tubular heat exchangers operated at high temperature, because they greatly simplify assembly of closely spaced tubes and afford some dimensional accommodation both during assembling operations and during use.

Stated generally, the two surfaces between which the tapered hoop-tensioned sealing ring is mounted may be two right cones, or one may be a cone and the other a conoid (or even a segment of a sphere), or both may be conoids, to mention examples hereinafter discussed.

Following the definitions in Merriman's 1935 edition of Webster's New International Dictionary, the words "cone" and "conoid" will be used in the strict definitive sense and "conoidal" will be used as a generic or inclusive term meaning "like a conoid; resembling or approaching a cone in shape."

This flexibility of expression is appropriate to the problem, because deformation of material under stress is a complex matter and resists precise statement in words. The best that can be done is to describe generally what happens, and after defining geometrical forms in terms which are undesirably rigid, make it clear that elasticity of materials is inherently present and offers limits within which the rather definitely stated geometrical terms may properly be relaxed.

Several embodiments of the invention will now be described by reference to the accompanying drawing, in which:

Figure 6 is a view half in axial section and half in elevation of a return bend fitting of the streamline type incorporating this invention.

Figures 7 and 8 are respectively an end elevation and a view half in axial section and half in side elevation of a box type return bend fitting in which the improved joint is incorporated.

All of the above embodiments involve the same basic principle and parts in the figures which are essentially identical will be identified by the same reference numerals.

Figure 1:
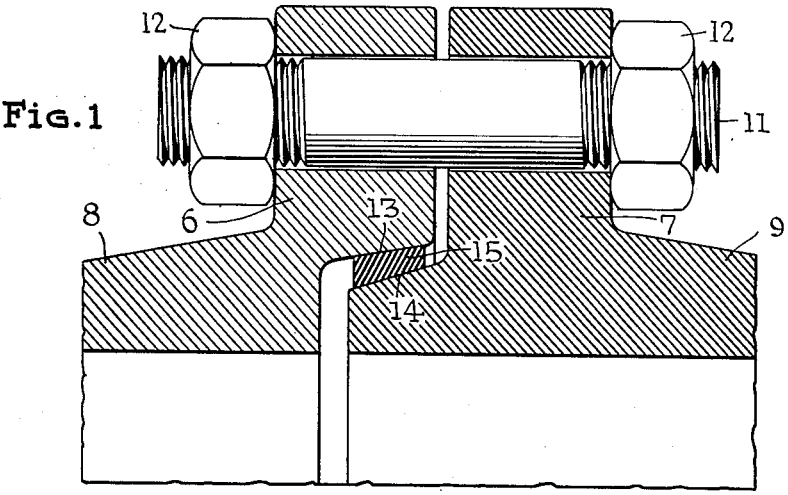
Figure 1 is a fragmentary section of a joint between two rings which, in the ordinary case, would be flanges at the ends of pipe sections. In this view the sealing ring is mounted between two converging right conical seal surfaces.

Reference should first be made to Figure 1. In this figure, 6 and 7 represent flanges at the ends of two aligned pipe sections 8 and 9. Bolts 11, with nuts 12, are used to hold the flanges together. It will be readily understood that the flanges are circular, surround the ends of the pipes, and that a plurality of bolts 11 are arranged at intervals around the flanges as in any bolted flange construction. The use of flanges connected by bolts is adopted purely for illustrative purposes, for any of the various known means for connecting flanges together might be used.

The bolts 11 have free fits in the holes through the flanges so that the joint about to be described can be self-centering. The flange 6 is bored to afford a concave conical seal surface 13. The flange 7 has a projecting rim or spigot which is turned to afford a convex conical seal surface 14. Between the seal surfaces 13 and 14 is clamped the sealing ring 15. In its unstressed condition ring 15 fits both of the surfaces 13 and 14.

When the joint is made up, the bolts 11 are tightened sufficiently to position the flanges 6 and 7 relatively to one another, and to establish initial sealing contact between sealing ring 15 and the seal surfaces 13 and 14. Since fluid pressure in the connected pipes will force the ring 15 to its final sealing position, it is unnecessary to develop full sealing contact by setting up bolts 11. Because of this characteristic, the bolts, or any equivalent connectors which may be used, simply position the two connected parts and thereafter resist their separation. This affords a small but very useful tolerance in the lengths of connected pipes. Prior art devices dependent for their sealing action on initial tightening of connectors, such as bolts, do not afford such tolerance; in fact they are subject to an indeterminate variable, dependent on the extent to which the seal will deform and so are likely to be assembled under unpredictable and often very objectionable stresses. The invention affords a joint whose condition of stress is known.

The conical surfaces 13 and 14 are characterized by different angles at their apices, both apices being on the same side of the joint plane and the concave cone being the more acute. As a consequence, the interval between the surfaces 13 and 14, and the cross section of the ring 15, both taper and contract from left to right, that being the direction in which fluid pressure within the pipes 8 and 9 urges the ring 15.

The pressure in the pipes is commonly subject to variation. Temperature changes may affect the force with which the bolts 11 draw the flanges together, and may also cause changes in the lengths of the connecting pipes. Any of these conditions, or all of them, are likely to cause minute relative movements in an axial direction between the surfaces 13 and 14. Since the ring 15 is constantly subject to fluid pressure urging it to the right, it has a tendency to move toward the base of the cone 14. That tendency puts the ring under compression between the surfaces 13 and 14 and also subjects the ring to hoop tension. Since the ring is elastic it is attenuated to a minute extent. That attenuation is evidenced chiefly by a diminution of the interval measured between the surfaces 13 and 14.

This concept can be clarified by a very simple analysis. Consider ring 15 in an unstressed condition in contact with seal surface 13. Translatory motion of the ring to the right would cause the ring to leave surface 13. Now consider the seal surfaces 13 and 14 positioned as in Figure 1 and held by the bolts 11 against relative motion, except such as is permitted by elastic elongation of the bolts, and observe what must happen to the ring 15 when forced by rising fluid pressure into the narrowing interval between surfaces 13 and 14. Contact of ring 15 with surface 14 obviously is assured, but the ring stretches and is reduced in cross sectional area. The mean circumference increases and the cross-sectional area decreases at related rates and there must be some simple form for surface 13 which will assure maintained contact between ring 15 and surface 13.

Appropriate coordination of seal surfaces 13 and 14 is the crux of the inventive concept, and there are various ways of defining seal surface 13 as a function of seal surface 14.

One way of describing a suitable seal surface 13 as a function of the seal surface 14 is to say that the surface 13 conforms substantially to the trace of the periphery of the ring 15 as that ring is forced toward the base of the cone 14. This is rather a subtle concept, and can be clarified by discussing the matter in terms of the interval between the two seal surfaces. The sealing ring always conforms to that interval.

Assume that the attenuation of the ring 15 as it is forced toward the base of the cone 14 is evidenced chiefly by diminution of the radial thickness of the ring 15 (an assumption which is nearly but not precisely correct). Then all cross sections through ring 15 taken on planes normal to the axis of the ring should have substantially uniform cross-sectional areas.

The significance of this arises from the fact that when the ring is stretched, its circumference increases and its thickness decreases in approximately inverse relation. Hence, its cross-sectional area remains approximately constant.

Another, and perhaps the best, way of describing surface 13 as a function of surface 14 is to imagine an O-ring of rubber rolled from the small toward the large end of surface 14 while it encircles the surface. Of course, a rubber ring so stressed in tension distorts from a true toric form, but imagine that in some way it is caused to retain true toric form and constant volume. The trace of such a ring would be a desirable cross section for ring 15. This is just another way of saying that the outer periphery of the toric ring would move in tangency to a desirable surface 13.

The concept has now been stated in different terms, partly to clarify the principle of the invention, and partly to emphasize the fact that elasticity of the materials used permits some departure from strict geometrical forms. Obviously the explanatory statements do not lead to precisely the same forms, yet either is usable.

The above explanation makes it clear that the invention can be embodied by the use of two properly related right conical surfaces such as 13 and 14 and commercial embodiments of that type are contemplated.

A practical limitation on the use of such an embodiment arises from the fact that it requires precise alinement of the connected parts, a condition not always attainable.

Figure 2:
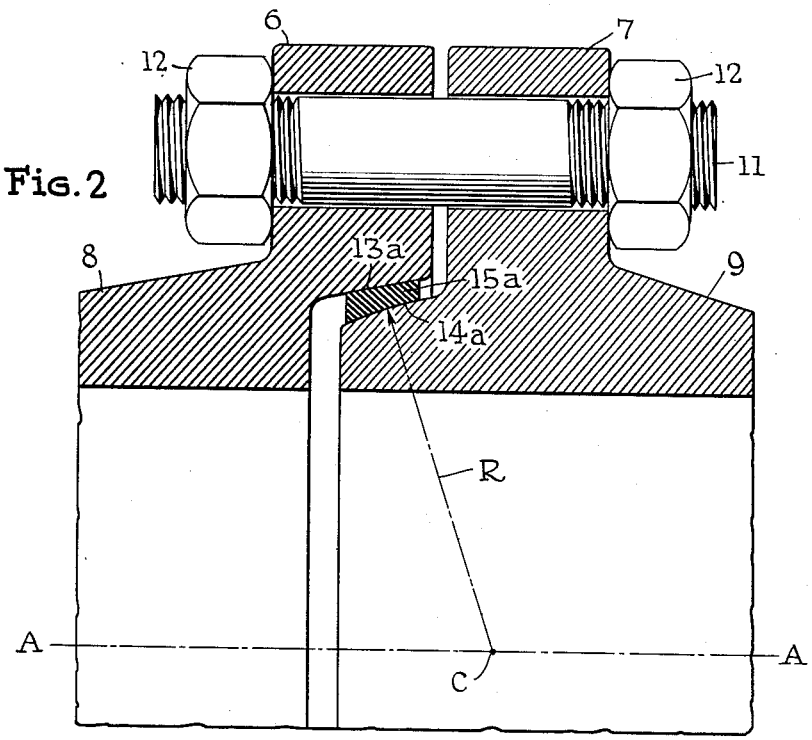
Figure 2 is a similar view showing a modification in which the convex seal surface is a conoid and specifically a segment of a sphere and the concave seal surface is a cone.

To relax this requirement, and extend the availablity of the invention to a much wider range of commercial installations, recourse may be had to the construction shown in Figure 2. In this figure the parts numbered 6 to 12, inclusive, are identical. The surface 13a is a cone and may even be identical with the cone 13. The surface 14a is a conoid and specifically the segment of the sphere whose radius is R and whose center is at the point C on the common axis A—A of the pipes. The ring 15a necessarily assumes a modified form that will mate satisfactorily with both of the surfaces 13a and 14a.

It is apparent that when the ring 15a is forced over the convex conoid 14a toward the base of the latter, the periphery of the ring 15a will not trace an imaginary solid precisely conforming to the cone 13a. However, it is possible to derive such a surface by geometrical methods and then to select a cone such as 13a which will approximate the surface sufficiently closely to insure satisfactory internal and external seals. This follows from the fact that the seal ring and the flanges carrying the seal surfaces are composed of elastic metal and the actual shift of the ring under pressure is small. Thus, the embodiment illustrated in Figure 2 retains the sealing characteristics of the form in Figure 1 to a useful degree, and offers the added advantage that precise alinement is not necessary. Joints of this type are expected to enjoy a more diversified commercial use than the type shown in Figure 1.

Figure 3:
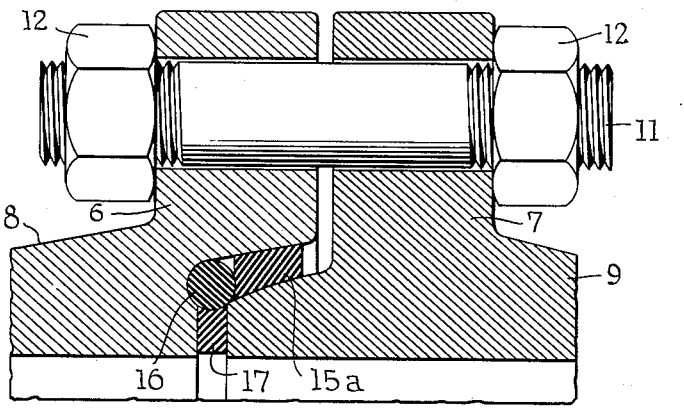
Figure 3 is a view similar to Figure 2 indicating the possibility of using a rubber-like insert to fill the gap between the rings so that turbulent flow of liquid in the pipe will not be caused at this point.

The embodiment illustrated in Figure 3 is the same as that shown in Figure 2 and the parts are similarly numbered. The view is added to illustrate the possible inclusion of an O-ring 16 and a flat gasket 17 (which could, if preferred, be formed integrally with the ring 16). These are used to fill the gap in the joint and prevent the formation of eddies in liquid flowing through the pipe. Since rubber is plastic and flows readily, the pressure in the pipe will react on the sealing ring 15a just as it does in Figure 2.

Figure 4:
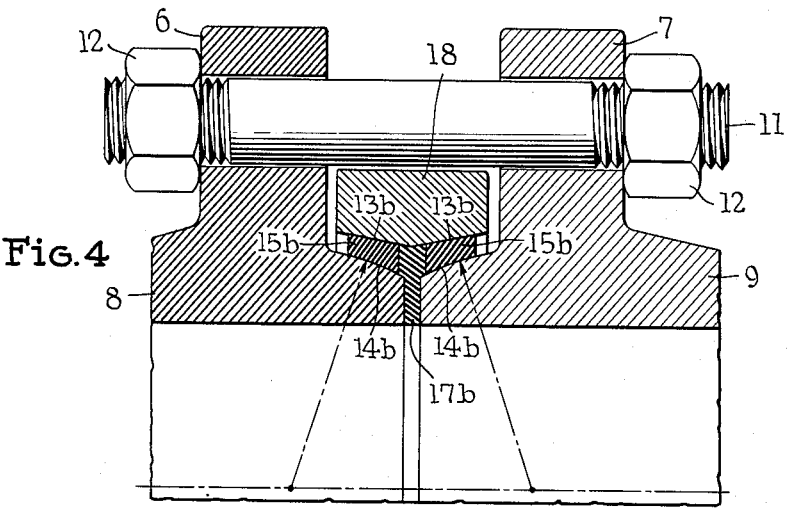
Figure 4 shows the application of the invention to a structure in which both pipe flanges are identical so that the bell and spigot construction characteristic of Figures 1–3 is avoided. According to Figure 4, a ring which carries the concave conical elements is positioned between the flanges and is sustained solely by two identical sealing rings.
Figure 5:
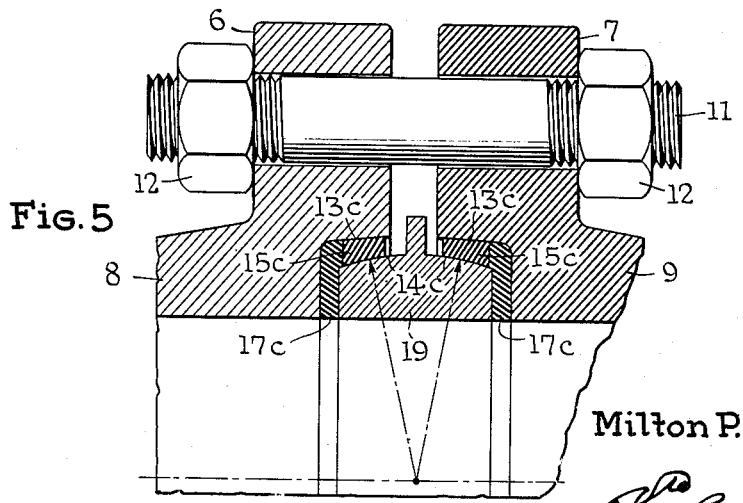
Figure 5 shows an arrangement which is the reverse of that shown in Figure 4 in that there is an interposed ring which carries the convex conoids and which is positioned by two sealing rings.

The constructions shown in Figures 4 and 5 are adopted so that both ends of a section of pipe may be identical. In Figure 4 parts 6—12 have the numbering previously used for like parts, and flanges 6 and 7 each carry a convex conoid 14b on which are seated two similar sealing rings 15b. These seal on concave conical surfaces 13b, reversely arranged on a floating ring 18. The principle is exactly the same as that involved in the structures of Figures 1 and 2. The surfaces 14b could be right circular cones instead of conoids where the necessity of accurate alinement is a tolerable condition. A rubber filler 17b is shown.

Figure 5 again uses the same numbering for the parts 6—12. In this case concave conical surfaces 13c are formed in the flanges 6 and 7 and convex conoidal surfaces 14c are formed on a floating insert 19, which is sustained by two sealing rings 15c functionally identical with the rings 15b, 15a, and 15 already described. Here again conical surfaces could be substituted for the surfaces 14c where the resulting requirement of precise alinement is acceptable. Rubber fillers 17c are shown.

The arrangements shown in Figures 4 and 5 are particularly useful for use on valves and other special fittings, for then all connections to the fittings can be identical, a matter of great practical importance.

The fact that the parts carrying the seal surfaces are held against separation rather than being drawn together initially by the connecting means favors compact constructions of great practical utility. A striking example of this occurs in heat exchangers used in oil refining. Here closely spaced tubes must be connected by return bends. Both pressures and temperatures are high and subject to wide variation.

Figure 6 shows the invention applied to a return bend specially suited to this service and permitting close spacing of the bends. In this figure 21, 21 are parallel runs of tubing shown expanded into the fittings 22 by conventional means. Each fitting 22 has an undercut shoulder 23 to engage ring 24 which would be made in two parts for convenience in assembly. A sleeve like union nut 25 engages the ring 24 and has internal threads to engage external threads on the U-bend 26, the engaging threads being indicated at 27. Each nut 25 is provided with an appropriate number of hammer-lugs 28, one of which appears on the right hand nut in Figure 6. These lugs are the sole means provided for turning the nuts.

The seal between fitting 22 and return bend 26 is identical with that shown in Figure 2 and hence the seal parts are identified by the numbers used in Figure 2. Thus, fitting 22 has the concave conical seal surface 13a, U bend 26 has the convex conoidal seal surface 14a, and the sealing ring is 15a. As in Figure 2 the surface 14a is a segment of a sphere whose radius is $R_1$. This affords some freedom of alinement requiring similar positional accommodation between the internal flange 29 on nut 25 and the surface 31 on ring 24 engaged thereby. The radius $R_2$ indicates that the surface 31 is a segment of a sphere concentric with that of surface 14a.

Removal of divided ring 24 permits nut 25 to clear the flanged end of fitting 22 and so be drawn off over it. The hammer lugs 28 are the only means needed for turning the nuts during assembly since the tightness of the joint is established by internal fluid pressure acting on ring 15a. Dismounting for cleaning and repair is equally simple.

Obviously the diameter of nuts 25 can be made quite small, and since this dimension determines the minimum tube spacing, the construction favors close spacing of tubes, often a factor of great practical importance.

As indicated in Figures 7 and 8 the invention may also be used with box-type return bends, and favors a very simple arrangement for sealing removable plugs.

In Figures 7 and 8 two parallel tube runs are indicated at 32, 32, the ends of the tubes being expanded into the box fitting 33. Such fittings customarily have removable access plugs alined with each tube run. The invention affords for the first time a pressure sealed joint for such plugs in which the force reaction of the plug is absorbed by means distinct from the sealing ring and the seal surfaces. Here, as in other described embodiments, the two seal surfaces are held in definite spaced relationship (within the elastic resistance of the materials used) so that the fluid pressure reaction on the sealing ring determines the loading of that ring.

Another advantage is that the plug and sealing ring are directly withdrawable, and the ring may move to and from its position without flexure. The opening can readily be made as large as the bore of the tube or even larger.

The plug 34 has a convex conoidal seal surface 14a opposed to the right conical seal surface 13a surrounding the opening in fitting 33. The sealing ring appears at 15a, these numbers being used because the seal conforms to the type shown in Figure 2.

The fitting 33 has two annular flanges 35, each coaxial with a corresponding tube 32 and each formed with an inward-presented internal shoulder 36. Against each shoulder there seats an annulus 37 which is internally threaded to receive a tubular thrust nut 38 which engages the plug 34. The threads between the annulus and nut are shown at 39. Opposite edge portions of the annulus 37 are cut away on parallel secant lines, indicated at 41 in Figure 7, so that the annulus may be withdrawn through the opening within flange 36 after tilting. A stem 42 on the plug facilitates handling the plug and the annulus as a unit during the tilting and withdrawing operation. Each tubular nut 34 has a hexagonal wrench socket 43 (see Figure 7).

There is an important general consideration which can best be explained with reference to Figure 1, though it applies to all the forms illustrated. The difficulty of producing a satisfactory pressure-tightened seal in a flanged coupling arises from the fact that the cone 13 enlarges in the direction in which the ring 15 is moved by pressure. Consequently, the design of this surface requires the most careful consideration. In any embodiment of the device, if movement of the ring 15 to the right tends to produce leakage between the ring 15 and the surface 13, the appropriate correction is to increase the acuteness of angle at the apex of the cone 13.

While it is preferred that when a cone and a conoid are opposed the cone is the encircling surface, this arrangement can be reversed. It is theoretically possible to use two conoids in opposed relation, but this is not considered desirable because the absence of an alining tendency might lead to faulty positioning of the interposed ring.

As stated previously, a description involving geometric forms is much more inelastic than the material of which these joints are made. The material is subject to elastic deformation. It may even be subject to plastic deformation under extreme conditions. Consequently, in interpreting the necessarily definite wording of the claims due consideration must be given to the fact that, under the high pressures here in contemplation, no part maintains absolutely the form which it has when unstressed. Consequently, interpretation of the claims in similarly rigid terms would be wholly unrealistic. Applicant claims the benefit of a reasonably elastic interpretation.

I claim:

1. A pressure tightened joint between two units arranged in opposed relation and subject to fluid pressure acting outward and tending to separate them, said joint comprising in combination, said units: means engaging the units and serving to prevent separation thereof; means affording an annular interval between said units narrowing outward, said means including related conoidal seal surfaces on said units, one of said surfaces being concave, opposed to and surrounding the other which is convex, the apices of said conoidal surfaces being on the same side of the joint plane and the apex angle of the concave surface being the more acute; and a sealing ring of substantially rigid material bridging the interval between said opposed seal surfaces, the face of said ring toward said apices being freely exposed to said fluid pressure, the relation of said surfaces being such that the concave conoidal surface conforms substantially to an imaginary surface generated by the periphery of the ring when the ring, while encircling the convex conoid, is forced toward the base thereof.

2. A joint, as defined in claim 1, in which one of said surfaces is a right circular cone.

3. A joint, as defined in claim 1, in which the outer of said surfaces is a right circular cone.

4. A joint, as defined in claim 1, in which each of said surfaces is a right circular cone.

5. A joint, as defined in claim 1, approximating the defined relationship between the two conoid surfaces closely enough to permit elasticity of the components to compensate for such errors as exist and in which the outer of said surfaces is a right circular cone and the inner thereof is a conoid whose generatrix is a circular arc centered on the axis of the cone.

6. A pressure tightened joint between two units arranged in opposed relation and subject to fluid pressure acting outward and tending to separate them, said joint comprising in combination, said units; means engaging the units and serving to prevent separation thereof; means affording an annular interval between said units narrowing outward, said means including related conoidal seal surfaces on respective units, one of said surfaces being concave, opposed to and surrounding the other which is convex, the apices of said conoidal surfaces being on the same side of the joint plane and the apex angle of the concave surface being the more acute; and a sealing ring of substantially rigid material bridging the interval between said opposed seal surfaces, the face of said ring toward said apices being freely exposed to said fluid pressure, the relation between said seal surfaces being such that the interval between them is characterized by substantially constant cross-sectional area on planes substantially normal to the axes of the seal surfaces.

7. A pressure tightened joint between two units arranged in opposed relation and subject to fluid pressure acting outward and tending to separate them, said joint comprising in combination, said units; means engaging the units and serving to prevent separation thereof; means affording an annular interval between said units narrowing outward, said means including related conoidal seal surfaces on respective units, one of said surfaces being concave, opposed to and surrounding the other which is convex, the apices of said conoidal surfaces being on the same side of the joint plane and the apex angle of the concave surface being the more acute; and a sealing ring of substantially rigid material bridging and substantially filling the interval between said opposed surfaces, the face of said ring toward said apices being freely exposed to said fluid pressure, said interval and the ring conforming to an imaginary solid which would be generated by rolling an encircling contractile torus of constant volume over the convex conoid between planes normal to the axis of the conoid and near to the limits of opposition of the conoidal seal surfaces.

8. A hollow member adapted to be subjected to high internal fluid pressure and having a passage leading from its interior and terminating in an outwardly flaring concave conoidal seal surface; a closure for said passage having an outwardly more flaring convex conoidal seal surface adapted to be opposed to the first named seal surface to define between them an annular interval which narrows outward; means supported on the hollow member for sustaining said closure against the force reaction of fluid pressure on the closure; and an elastic metal sealing ring bridging and substantially filling said annular interval, said ring being subject to said pressure on its inward face, said conoidal seal surfaces being so related geometrically that cross sections of said ring taken on planes normal to its axis are substantially equal in area.

References Cited in the file of this patent

UNITED STATES PATENTS

| Number | Name | Date |
|---|---|---|
| 48,797 | Dutemple | July 18, 1865 |
| 248,784 | Page | Oct. 25, 1881 |
| 680,649 | Crombie | Aug. 13, 1901 |
| 724,939 | Reis | Apr. 7, 1903 |
| 1,475,090 | Taylor | Nov. 20, 1923 |
| 1,853,012 | Brandt | Apr. 5, 1932 |
| 1,924,657 | Saine | Aug. 29, 1933 |
| 2,046,597 | Abegg | July 7, 1936 |
| 2,051,557 | Hunziker | Aug. 18, 1936 |
| 2,187,217 | Winslow | Jan. 16, 1940 |
| 2,277,990 | Lanninger | Mar. 31, 1942 |
| 2,470,883 | Boissou | May 24, 1949 |
| 2,552,750 | Thornhill | May 15, 1951 |
| 2,582,995 | Laurent | Jan. 22, 1952 |